United States Patent [19]

Thagard et al.

[11] Patent Number: 5,765,348
[45] Date of Patent: Jun. 16, 1998

[54] DEVICE FOR MOWING AND CUTTING

[75] Inventors: Jeffrey Thagard, Ozark; Charles Greene, Troy; Billy Brown, Ozark, all of Ala.

[73] Assignee: Brown Manufacturing Corporation, Ozark, Ala.

[21] Appl. No.: 796,368

[22] Filed: Feb. 6, 1997

Related U.S. Application Data

[62] Division of Ser. No. 569,015, Dec. 7, 1995, Pat. No. 5,657,620.

[51] Int. Cl.$^6$ .......................... A01D 34/66; A01D 34/86
[52] U.S. Cl. ..................... 56/15.2; 56/320.1; 56/16.4 R; 56/DIG. 24
[58] Field of Search .................. 56/15.2, 320.1, 56/16.4 R, 320.2, 16.8, DIG. 7, DIG. 9, DIG. 11, DIG. 20, DIG. 24; 144/34 R, 336; 47/1.01, 1.7

[56] References Cited

U.S. PATENT DOCUMENTS

| | | |
|---|---|---|
| 2,044,884 | 6/1936 | Keller . |
| 2,878,633 | 3/1959 | Mullin . |
| 2,908,444 | 10/1959 | Mullin . |
| 2,939,636 | 6/1960 | Mullin . |
| 3,369,350 | 2/1968 | Rogers et al. . |
| 3,483,905 | 12/1969 | Lawrence . |
| 3,727,386 | 4/1973 | Jespersen et al. . |
| 3,759,023 | 9/1973 | Comer . |
| 3,857,515 | 12/1974 | Zennie . |
| 3,927,513 | 12/1975 | Ramaker et al. . |
| 3,979,889 | 9/1976 | Vansteelant . |
| 4,030,277 | 6/1977 | Christopherson ............... 56/320.1 |
| 4,282,704 | 8/1981 | Stevens ............................ 56/320.2 |
| 4,306,409 | 12/1981 | Wulfers ............................ 56/320.2 |
| 4,354,341 | 10/1982 | Hathaway ......................... 56/503 |
| 4,378,668 | 4/1983 | Gullett ............................. 56/12.7 |
| 4,445,312 | 5/1984 | Cartner ............................ 56/15.5 |
| 4,509,315 | 4/1985 | Giguere ........................... 56/10.7 |
| 4,738,091 | 4/1988 | Kulak et al. ..................... 56/320.2 |
| 4,769,977 | 9/1988 | Milbourn .......................... 56/15.2 |
| 4,802,327 | 2/1989 | Roberts ............................ 56/15.2 |
| 4,921,024 | 5/1990 | Wiemeri et al. ................. 144/336 |
| 4,926,622 | 5/1990 | McKee .............................. 56/16.8 |
| 4,946,488 | 8/1990 | Davison ........................... 56/14.9 |
| 4,960,157 | 10/1990 | Sheets ............................. 144/34 R |
| 4,998,573 | 3/1991 | York ............................... 144/34 R |
| 5,005,344 | 4/1991 | McCracken ...................... 56/14.7 |
| 5,237,803 | 8/1993 | Domingue, Jr. ................. 56/16.8 |
| 5,274,924 | 1/1994 | Lee ................................. 30/379 |
| 5,329,752 | 7/1994 | Milbourn .......................... 56/16.4 |
| 5,408,814 | 4/1995 | Milbourn .......................... 56/15.2 |

FOREIGN PATENT DOCUMENTS

625488  8/1961  Canada .

*Primary Examiner*—Terry Lee Melius
*Attorney, Agent, or Firm*—Sterne, Kessler, Goldstein & Fox P.L.L.C.

[57] ABSTRACT

A device for mowing, cutting, and mulching of vegetation in a single pass over the terrain. A movable folding shroud is provided that is pivoted upward to expose a cutter for severing larger trees. The device may be configured so that mowing, cutting, and mulching operations are all performed while traveling in the same direction. Alternatively, the device may be configured so that mowing and mulching operations are performed while traveling in one direction, with cutting operations performed while traveling in the opposite direction. The device may also be configured with a dispensing assembly for applying chemicals onto the cut vegetation to obtain a more effective kill and minimize re-growth.

16 Claims, 7 Drawing Sheets

DEVICE FOR MOWING AND CUTTING

This application is a division of application Ser. No. 08/569,015, filed Dec. 7, 1995, now U.S. Pat No. 5,657,620.

FIELD OF THE INVENTION

The present invention relates to a device for mowing, cutting, and mulching of vegetation such as bushes, brush, and trees. More particularly, the present invention relates to a mowing, cutting, and mulching device having a movable folding shroud for exposing the cutter.

BACKGROUND OF THE INVENTION

Throughout the United States and in most of the world, electrical energy is provided to various consumers over electrical transmission or power lines supported by poles or towers. The area beneath and adjacent the electrical transmission lines must be kept substantially free of tall vegetation, such as bushes, brush, and trees. Such a zone is referred to herein as a "right-of-way". The area beneath and adjacent some telephone transmission lines supported by poles must be kept in a similar manner. Furthermore, many highways and roads include a right-of-way on either side that must also be kept in a similar manner.

After a right-of-way for electrical transmission lines or telephone transmission lines is initially cut through a wooded or vegetated area of land, the utility right-of-way must be maintained substantially vegetation-free. Particularly, vegetation such as bushes, brush, and trees must be cut to prevent them from growing into and interfering with the transmission lines. Additionally, the cut debris must be ground up or mulched. The reason for the grinding or mulching is two-fold. First, the utility right-of-way must be sufficiently clear to allow travel over the ground by repair and maintenance crews. Second, and more important, the utility right-of-way must not contain cut debris of a size that would interfere with the hydraulic lines and equipment contained on utility transmission line repair trucks. The safety of the personnel is jeopardized if the rights-of-way include cut debris of sufficient size to cause damage to the hydraulic drive systems or hydraulic lines of these repair trucks, or to cause any other type of mechanical damage. Thus, it is necessary not only to cut the debris in utility rights-of-way, but also to grind or mulch it so that the cut debris is of sufficiently small size.

Numerous conventional mowing or cutting devices are known. One conventional brush and tree cutter is shown in U.S. Pat. No. 3,483,905 to Lawrence. The Lawrence device is expensive to build, and expensive and difficult to maintain and keep operational. The Lawrence device also suffers from safety problems. One safety problem is that the protective bar and partial blade guard of the Lawrence device do not prevent debris cut by the rotating blade from flying out of the device. The Lawrence device also does not provide protection in the event of a mechanical failure of the rotating cutting blades.

Another safety problem of the Lawrence device arises because the ends of the protruding bar are free and unprotected. As the Lawrence device is operated, the unprotected, protruding free ends of the protective bar snag or grab wires, vines, fences, and the like. This problem is particularly acute with respect to guide wires for utility poles. The free ends of the Lawrence protective bar routinely snag on such guide wires. As a result, the protective bar can be pulled off the Lawrence device, and the utility pole can even be pulled down. This problem leads to damage to the Lawrence device, to the utility pole, and to the transmission lines, and can even lead to injury or death. When the protective bar is pulled off, it typically falls down into the blades, creating hazardous flying debris. The problem of the protective bar being pulled off is so common that a majority of users remove the protective bar for use of the Lawrence device.

Another drawback of the Lawrence device for use in clearing and maintaining utility rights-of-way is that it is not capable of grinding or mulching cut debris. Therefore, operation of the Lawrence device on a utility right-of-way would require at least a second pass over the terrain because cut debris that is too large poses a safety hazard for crews repairing or maintaining the utility transmission lines.

Another conventional device is disclosed in U.S. Pat. No. 4,445,312 to Cartner. The ends of the Cartner device are open, allowing cut debris to fly from the device at either end. The side-mounted boom configuration of the Cartner device makes the open ends a particular safety risk because the prime mover is not in a position to stop debris that flies from either end of the device, debris that could include a blade. Like the Lawrence device, the Cartner device is also not configured to grind or mulch cut debris. Thus, operation of the Cartner device on a utility right-of-way also requires at least a second pass over the terrain to grind or mulch the cut debris.

A more effective kill of vegetation can be obtained if chemicals, such as herbicides and the like, are sprayed onto the cut stems and stalks since the chemical then directly acts on the roots. This approach minimizes re-growth of the vegetation with a significantly reduced quantity of chemicals. However, when dispensing such chemicals, it is necessary to minimize wind drift or over-spray of the chemicals to other areas. In the conventional sprayer/cutter apparatus shown in U.S. Pat. No. 5,237,803 to Domingue, Jr., this is achieved through the use of mated circular shields and perimeter guards.

However, the Domingue device requires precise spacing between the circular shield and the blades, as well as critical positioning of openings in the circular shield for release of the pesticide spray. This makes the device harder and more costly to manufacture. The Domingue device is also expensive and difficult to maintain. The intricate shield arrangement of this device is damaged by the large debris moving at high speed as the cutter operates.

Thus, there is a need in the art for a device that is safe to operate, and that is capable of mowing, cutting, and mulching vegetation in a single pass over the terrain. There is a further need for such a device to include an apparatus that is easy and less costly to manufacture for spraying chemicals to obtain a more effective kill of the vegetation, while preventing wind drift and over-spray.

SUMMARY OF THE INVENTION

It is with these problems in mind that the present invention was developed. The present invention is a device that is safe to operate, and that is capable of mowing, cutting, and mulching vegetation in a single pass over the terrain. The device of the present invention includes cutting means, a deck lying in a plane substantially parallel to the path of the cutting means, and side or lateral shrouds coupled to the deck. In one aspect of the invention, a folding shroud is provided that includes a top portion and a cutter enclosing portion. The folding shroud moves between two positions: a downward enclosing position suitable for mowing and mulching operations; and an upward exposing position suitable for cutting operations.

In the downward enclosing position, the top portion of the folding shroud covers a portion of the cutting means that extends beyond one end of the frame of the device. The cutter enclosing portion encloses below the plane of the deck the end of the device adjacent the cutting means from one lateral side to the other lateral side. The folding shroud is pivoted upward to the upward exposing position, in which the folding shroud is located above the plane of the deck, and the portion of the cutting means extending beyond the frame is uncovered.

For mowing and mulching operations, a prime mover, such as a tractor, pulls the device over the terrain with the folding shroud in the downward enclosing position. For cutting operations, the prime mover reverses direction, and the folding shroud is moved to the upward exposing position. Movement of the folding shroud may be achieved through hydraulic actuators, preferably controlled by an operator.

The folding shroud may be divided into two separate sections. In such a configuration, the separate sections of the folding shroud may be independently movable.

In another aspect of the invention, the folding shroud includes a top portion, and side or lateral portions that form a chute. An end shroud may be provided to enclose the end of the device where the device is mounted to a prime mover. The folding shroud moves between two positions: a downward enclosing position suitable for mowing and mulching operations; and an upward exposing position suitable for cutting operations.

In the downward enclosing position, the top portion covers the portion of the cutting means that extends beyond one end of the frame of the device. The lateral portions of the folding shroud are located adjacent the lateral shrouds on each side of the device. In the upward exposing position, the lateral portions of the folding shroud, as well as the top portion, are located above the plane of the deck so that the portion of the cutting means that extends beyond the frame is uncovered.

A drape, made from a material such as rubber or chain, may be coupled to the top portion of the folding shroud at the end of the device adjacent the cutting means. Such a drape is disposed beyond the extended portion of the cutting means.

For mowing and mulching operations, a prime mover, such as a tractor, pushes the device over the terrain with the folding shroud in the downward enclosing position. For cutting operations, the folding shroud is moved to the upward exposing position. There is no need to change direction of the prime mover since all of the mowing, cutting, and mulching operations can be performed while traveling in the same direction. Movement of the folding shroud may be achieved through hydraulic actuators, preferably controlled by an operator.

In yet a further aspect of the present invention, a guard is provided that may be used with a device that includes a cutter having a portion that extends beyond the end of the device. The guard includes a folding shroud that may be configured with a top portion and a cutter enclosing portion. Alternatively, the guard may include a folding shroud configured with a top portion, and side or lateral portions that form a chute having a throat enclosed by a drape. The folding shroud moves between two positions: a downward enclosing position in which the top portion covers the extending portion of the cutter; and an upward exposing position in which the folding shroud is disposed above the plane of the cutter.

In yet a further aspect of the present invention, a device for mowing and cutting is provided. The device includes cutting means coupled to a frame, and a protective bar. The protective bar is biased outwardly by biasing means, such as a spring. With the protective bar in the outwardly biased position, the device is configured for mowing. When pressure is exerted on the protective bar, such as by impact with a tree, the spring compresses and the protective bar moves or slides inwardly toward the frame. This exposes the cutting means and configures the device for cutting operations.

Each end of the protective bar is pivotally secured to the frame. The intermediate portion of the protective bar is supported by supporting means coupled to the frame. The protective bar may be configured as two arcuate sections. In such a configuration, each arcuate section may have its own spring so that the arcuate sections are independently movable.

In yet a further aspect of the invention, the device includes apparatus for applying a chemical, such as a herbicide, onto the cut vegetation. The chemical application apparatus includes means for dispensing a chemical onto a rotating blade carrier, or other type of cutting means, so that the chemical is dispersed as the blade carrier rotates. The dispensing means may be configured so that the chemical passes through the plane of a deck of the device onto the blade carrier.

FEATURES AND ADVANTAGES

It is a feature of the present invention that mowing, cutting, and mulching operations can all be performed in a single pass over the terrain. It is a further feature of the present invention that chemicals can be dispensed during the single pass to provide a more effective kill and minimize re-growth of the vegetation.

It is a feature of the present invention that there are no free ends or protrusions to snag or catch on wires, vines, fences, and the like.

It is an advantage of the present invention that it is safe to operate. The present invention provides protection from flying or cut debris, and from hazards caused by snagging wires, vines, fences, and the like.

It is a further advantage of the present invention that chemicals can be dispensed while preventing over-spray and wind drift.

It is a further advantage of the present invention that mowing, cutting, and mulching operations can all be performed while traveling in the same direction, without having to stop and change directions.

It is yet a further advantage of the present invention that the device can be operated in a "pushing" configuration, in front of a prime mover, to provide more comfortable operator visibility and enhanced maneuverability.

A still further advantage of the present invention is that it is inexpensive to build and to maintain.

BRIEF DESCRIPTION THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DESCRIPTION OF THE PREFERRED EMBODIMENTS

Figure 1:
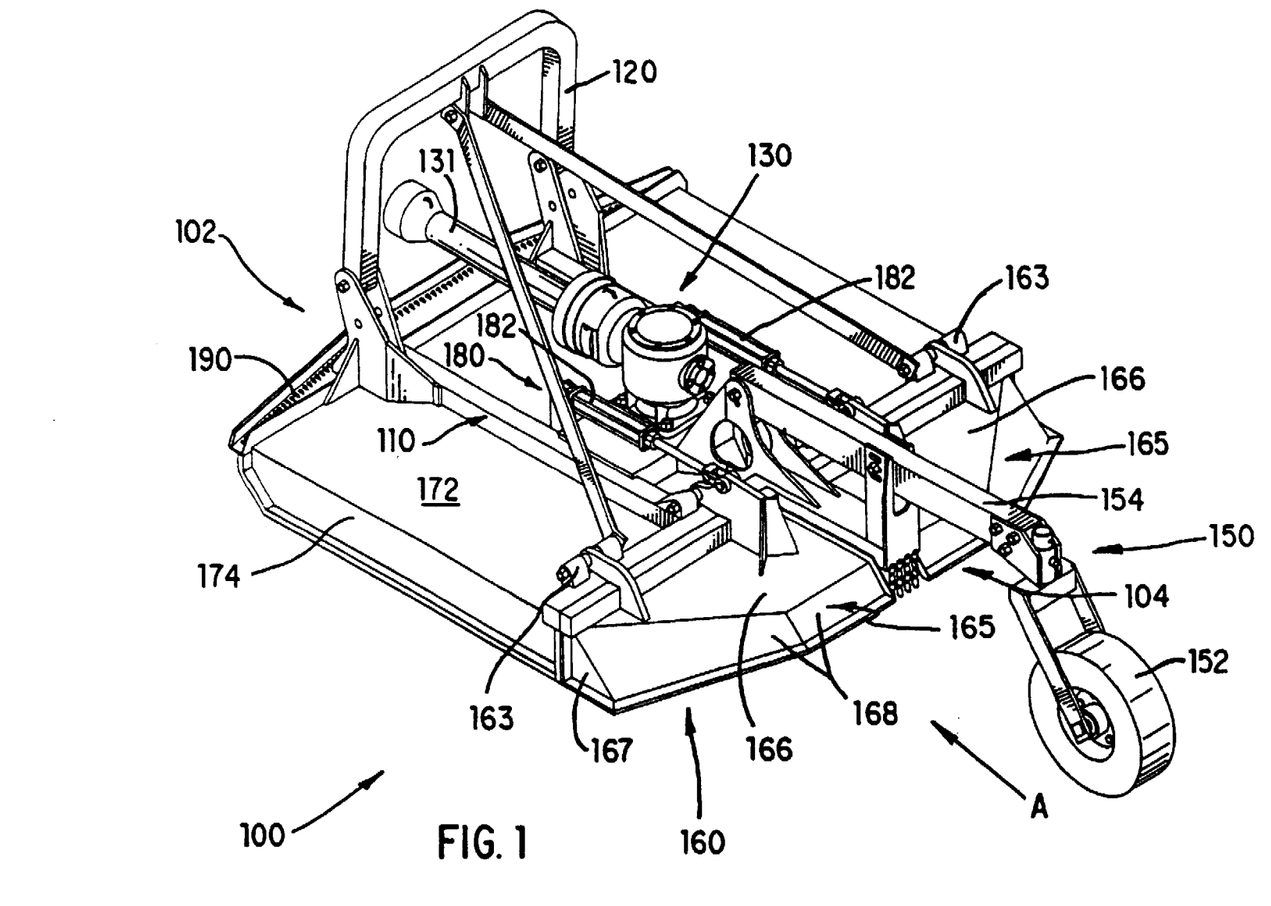
FIG. 1 shows a perspective view of a first embodiment of the present invention, with a folding shroud in the downward enclosing position.
Figure 2:
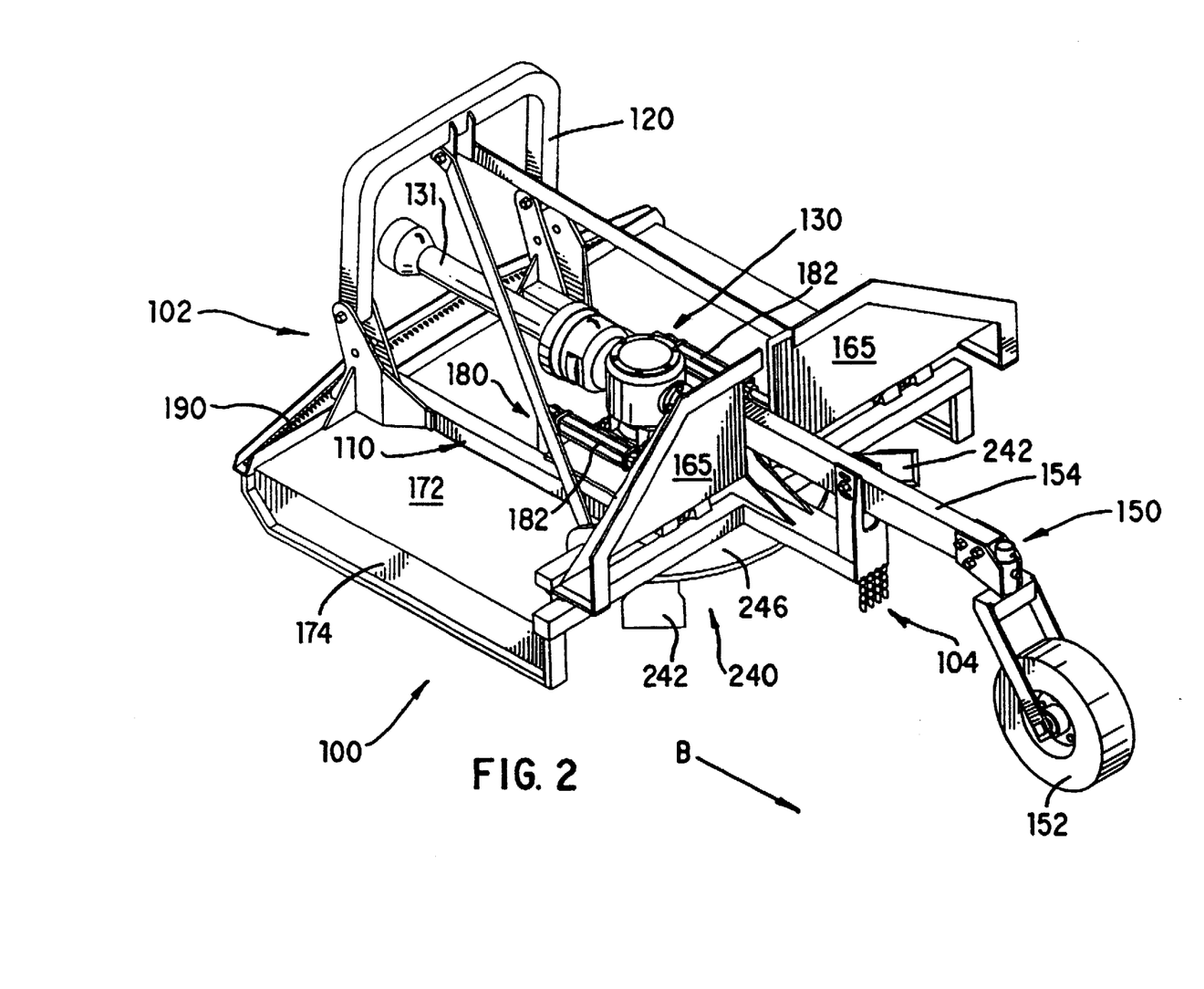
FIG. 2 shows a perspective view of the embodiment shown in FIG. 1, with the folding shroud in the upward exposing position.

With continuing reference to the drawing figures, one embodiment 100 of a device for mowing, cutting, and mulching is shown in FIGS. 1 and 2. Device 100 includes cutting means, such as a rotary cutting assembly 240 described in more detail below, for mowing, cutting, and mulching of vegetation such as bushes, brush, and trees. As will be explained in more detail below, the term "mowing" is used herein to refer to use of the device with the folding shroud in the downward enclosing position to sever brush, bushes and saplings having a diameter of up to approximately four inches. The term "cutting" is used herein to refer to use of the device with the folding shroud in the upward exposing position to sever small trees having a diameter greater than approximately four inches. The term "mulching" is used herein to refer to use of the device with the folding shroud in the downward enclosing position to grind up debris that has been severed either by "mowing" or "cutting".

In order to accomplish the foregoing mowing, cutting, and mulching operations, the device of the present invention is configured to provide a protective enclosure for mowing and mulching operations, and to partially expose rotary cutting assembly 240, or cutting means, for cutting operations. The device of the present invention is substantially symmetrical so that the components that comprise one lateral (left or right) side of the device are substantially identical to the corresponding components comprising the other lateral side of the device. The discussion below will be applicable to components of both the left and right lateral sides of the device unless otherwise indicated.

Figure 4:
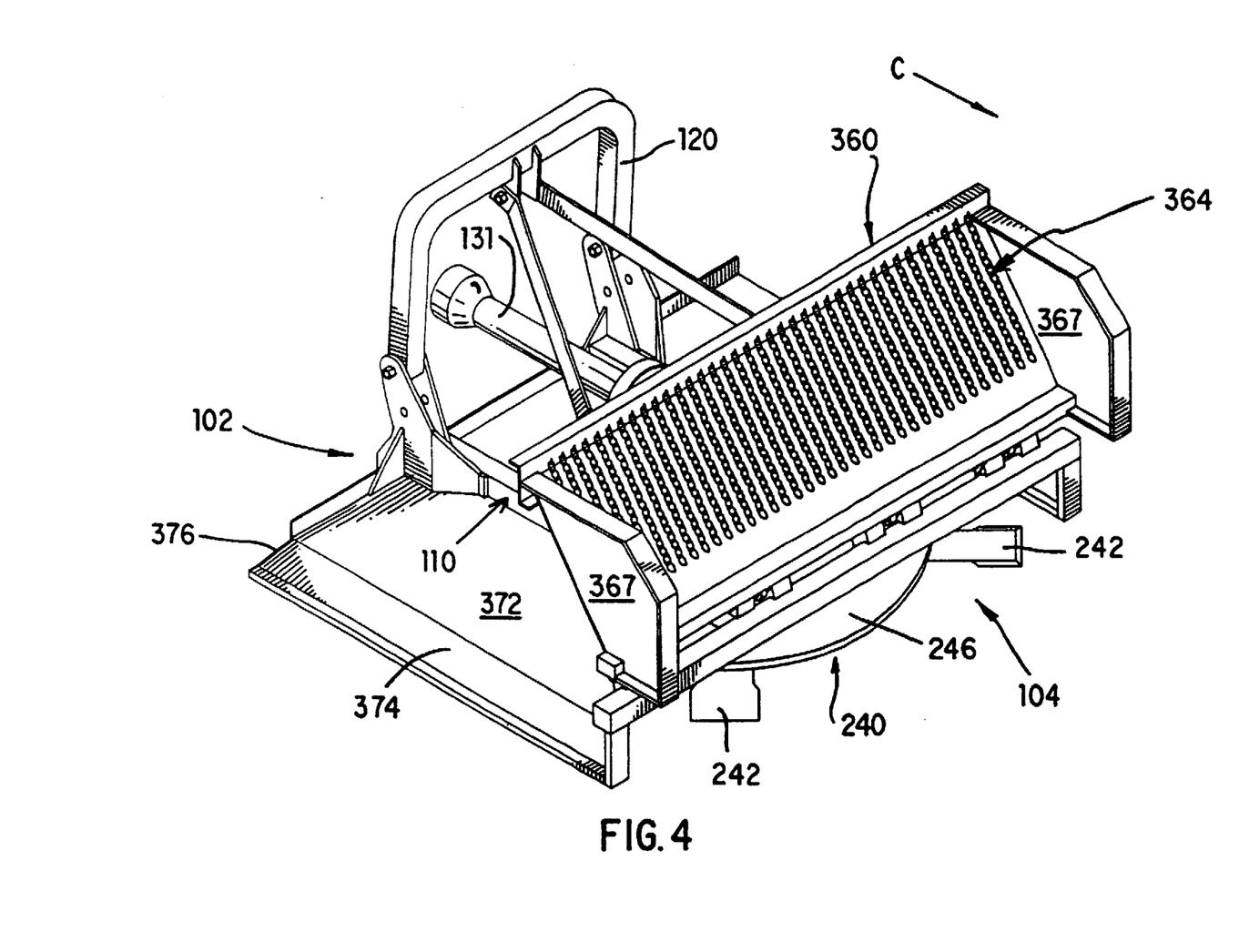
FIG. 4 shows a perspective view of the embodiment shown in FIG. 3, with the folding shroud in the upward exposing position.

With reference to FIG. 1, device 100 includes a frame, shown generally at 110. Frame 110 includes the tubular and angle iron superstructure or framework of the device. Attached to frame 110 is a deck 172. Deck 172 lies in a plane that is substantially parallel to the path of rotary cutting assembly 240 (see FIG. 2). As best seen in FIGS. 2 and 4, rotary cutting assembly 240 is coupled to frame 110 so that a portion of rotary cutting assembly 240 extends beyond one end of frame 110. Extending down from each lateral side of deck 172 is a lateral shroud 174. In a particularly preferred embodiment, deck 172 and the two lateral shrouds 174 are monolithic, formed by folding a single piece of steel. Alternatively, lateral shroud 174 can be attached to deck 172 by welding, bolting, or in other ways known to one of skill in the relevant art.

An end 102 includes a hitch 120 for mounting device 100 to a prime mover, such as a tractor. End 102 is enclosed by a chain drape 190. Preferably, chain drape 190 is stationary, and affixed to frame 110 in a conventional manner, such as by welding or through the use of bolts.

To expose the cutting means for cutting operations, device 100 includes a folding shroud, shown generally at 160 in FIG. 1. Folding shroud 160 is shown in FIG. 1 as including two sections 165, each being the mirror image of the other. Each folding shroud section 165 is pivotally and movably attached to frame 110, such as by a hinge 163. Folding shroud 160 is folded upward and toward end 102 to expose rotary cutting assembly 240, as shown in FIG. 2. It is to be understood that the present invention is not limited to a folding shroud that has two folding shroud sections as shown in FIGS. 1 and 2. Alternatively, folding shroud 160 may be configured to have any number of sections, or may be configured to have only a single section.

Each folding shroud section 165 includes a top portion 166, a lateral portion 167, and a cutter end portion 168. Lateral portion 167 extends along a portion of each lateral side of device 100. Cutter end portion 168 extends along an end 104 adjacent rotary cutting assembly 240. As shown in FIG. 1, cutter end portion 168 includes a straight section and an angled section. However, the present invention is not limited to such a configuration for cutter end portion 168. Lateral portion 167 and cutter end portion 168 together form a cutter enclosing portion of each folding shroud section 165.

As seen from FIGS. 1 and 2, folding shroud 160 is movable in a plane substantially perpendicular to the plane of deck 172 from a downward enclosing position to an upward exposing position. In the downward enclosing position, device 100, and rotary cutting assembly 240, are enclosed on three sides (two lateral sides and end 104 adjacent rotary cutting assembly 240) by lateral shrouds 174 and folding shroud 160. End 102 adjacent hitch 120 is enclosed by chain drape 190. In the downward enclosing position shown in FIG. 1, top portion 166 of folding shroud 160 covers the portion of rotary cutting assembly 240 that extends beyond frame 110. Lateral portion 167 encloses a portion of the lateral side of device 100 below the plane of deck 172. Cutter end portion 168 encloses end 104 of device 100 below the plane of deck 172. The cutter enclosing portion (lateral portions 167 and cutter end portion 168) encloses, below the plane of deck 172, end 104 from one lateral side to the other lateral side of the device. As explained more fully below, device 100 is configured for mowing and mulching operations with folding shroud 160 in the downward enclosing position.

In the upward exposing position shown in FIG. 2, folding shroud 160 is disposed above the plane of deck 172. Below the plane of deck 172, the portion of each lateral side occupied by lateral portion 167 is open, as is end 104 of device 100. The portion of rotary cutting assembly 240 that extends beyond frame 110 is uncovered. Thus, in the upward exposing position, rotary cutting assembly 240, particularly blade 242, is exposed for cutting operations.

Moving means, shown generally at 180, is used to move folding shroud 160 between the downward enclosing position and the upward exposing position. One particularly preferred moving means is hydraulic means responsive to manual or operator actuation. As shown in FIG. 1, a hydraulic actuator or cylinder 182 is connected to each folding shroud section 165 for pivotal movement between the downward enclosing position and the upward exposing position. The phrase "between the downward enclosing position and the upward exposing position" as used herein is meant to include the movement from the downward enclosing position to the upward exposing position, and from the upward exposing position to the downward enclosing position.

Each folding shroud section 165 is preferably independently movable so that an operator can selectively pivot one folding shroud section 165 independently of the other folding shroud section. The hydraulic connections for independent operator control of each hydraulic actuator 182 would be apparent to one of skill in the relevant art, and can be achieved in a conventional manner. Alternatively, moving means 180 can include hydraulic means responsive to manual actuation configured so that each folding shroud section 165 pivots or moves simultaneously with the other. In such a configuration, the two folding shroud sections 165 illustrated in FIGS. 1 and 2 would simultaneously move up and down between the downward enclosing position and the upward exposing position.

Cutting means, such as rotary cutting assembly 240, is attached to frame 110 so that the plane of deck 172 is disposed substantially parallel to the path of the cutting means. As shown in FIG. 2, rotary cutting assembly 240 includes one or more blades 242 attached by a blade bolt (not shown) to a blade bar or carrier 246. In a preferred embodiment, rotary cutting assembly 240 includes four of the blades labeled as element 242. A particularly preferred four-blade configuration is disclosed in U.S. Pat. No. 3,483,905 which is incorporated herein in its entirety by reference. Alternatively, rotary cutting assembly 240 can be configured with two or four blades that are not reversed, or oppositely inclined.

Rotary cutting assembly 240 is driven by a gear box 130 in a conventional manner so that blade 242 is spinning or rotating in a substantially horizontal plane. Gear box 130 is powered by a shaft 131 that is in turn powered, for example, by a power take-off on a prime mover, such as a tractor. Preferably, the substantially horizontal plane is substantially parallel to the plane of deck 172. Blade carrier 246 can be a round fly wheel operatively connected to gear box 130. In the mowing and mulching configuration with the blades enclosed, the device of the present invention can sever bushes, brush, and saplings up to approximately four inches in diameter. As one example of the cutting configuration with the blades exposed, the device of the present invention is capable of cutting an approximately eight inch diameter tree in approximately 0.3 second.

As shown in FIGS. 1 and 2, a tail wheel assembly 150 is attached to frame 110 so that it is disposed between folding shroud sections 165. Tail wheel assembly 150 includes a tail wheel arm 154 extending preferably from the centerline of deck 172. A tail wheel 152 is attached to the outer end of tail wheel arm 154. Tail wheel assembly 150 relieves a prime mover 600 (see FIG. 6) from carrying the entire weight of device 100. Tail wheel assembly 150 also functions as a height gauge for device 100 to keep it out of contact with the ground, acting in a caster-like fashion to facilitate operation in any direction.

Figure 6:
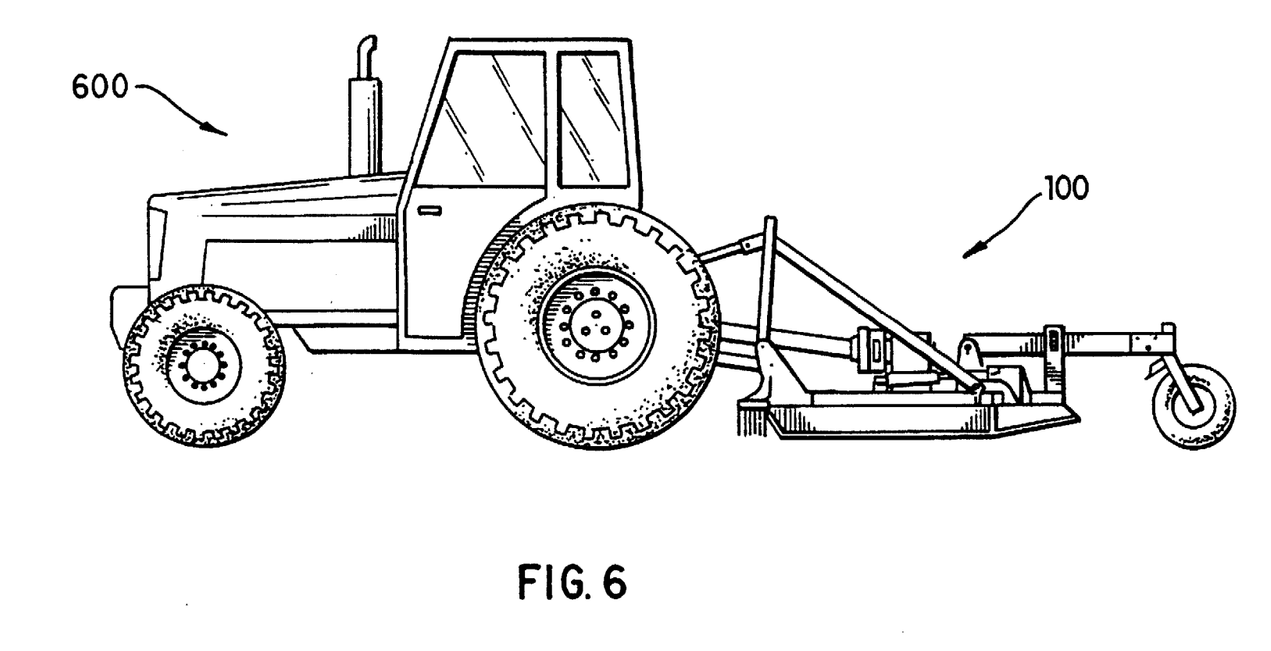
FIG. 6 shows a prime mover coupled to the device of the present invention.

In operation, device 100 is mounted to prime mover 600 via hitch 120 located at end 102, as shown in FIG. 6. Hitch 120 may be an A-frame hitch, and is preferably a three-point hitch. Prime mover 600 can include a tractor or other suitable means for moving device 100 over the surface of the ground. In the embodiment illustrated in FIGS. 1 and 2, device 100 is mounted to the rear of prime mover 600 in a "pulling" configuration. In such a configuration, prime mover 600 pulls or drags device 100 over the surface of the ground so that prime mover 600 runs over the vegetation to be severed before the vegetation reaches device 100. Arrow A in FIG. 1 shows the direction of movement of device 100 during mowing and mulching operations with folding shroud 160 in the downward enclosing position (forward direction). Arrow B in FIG. 2 shows the direction of movement of device 100 during cutting operations with folding shroud 160 in the upward exposing position (reverse direction).

As prime mover 600 is driven by an operator in forward direction A with folding shroud 160 in the downward enclosing position, vegetation (such as brush, bushes, and saplings) is being mowed and mulched into small pieces. When a tree requiring cutting (too large a diameter for mowing) is encountered, the operator of the prime mover actuates moving means 180 to move folding shroud 160 from the downward enclosing position to the upward exposing position, thereby exposing blade 242 for cutting. Prime mover 600 is then operated in reverse direction B to back into the tree to be cut. Once the tree is cut, the operator actuates moving means 180 to move folding shroud 160 from the upward exposing position to the downward enclosing position. Prime mover 600 is then turned around, and run in forward direction A over the cut tree for mulching or grinding. If device 100 is configured with independently movable folding shroud sections 165, the operator can selectively open only the one folding shroud section that is necessary to cut the tree. This provides for maximum enclosure of rotary cutting assembly 240 during the cutting operation, thereby enhancing safety.

Figure 3:
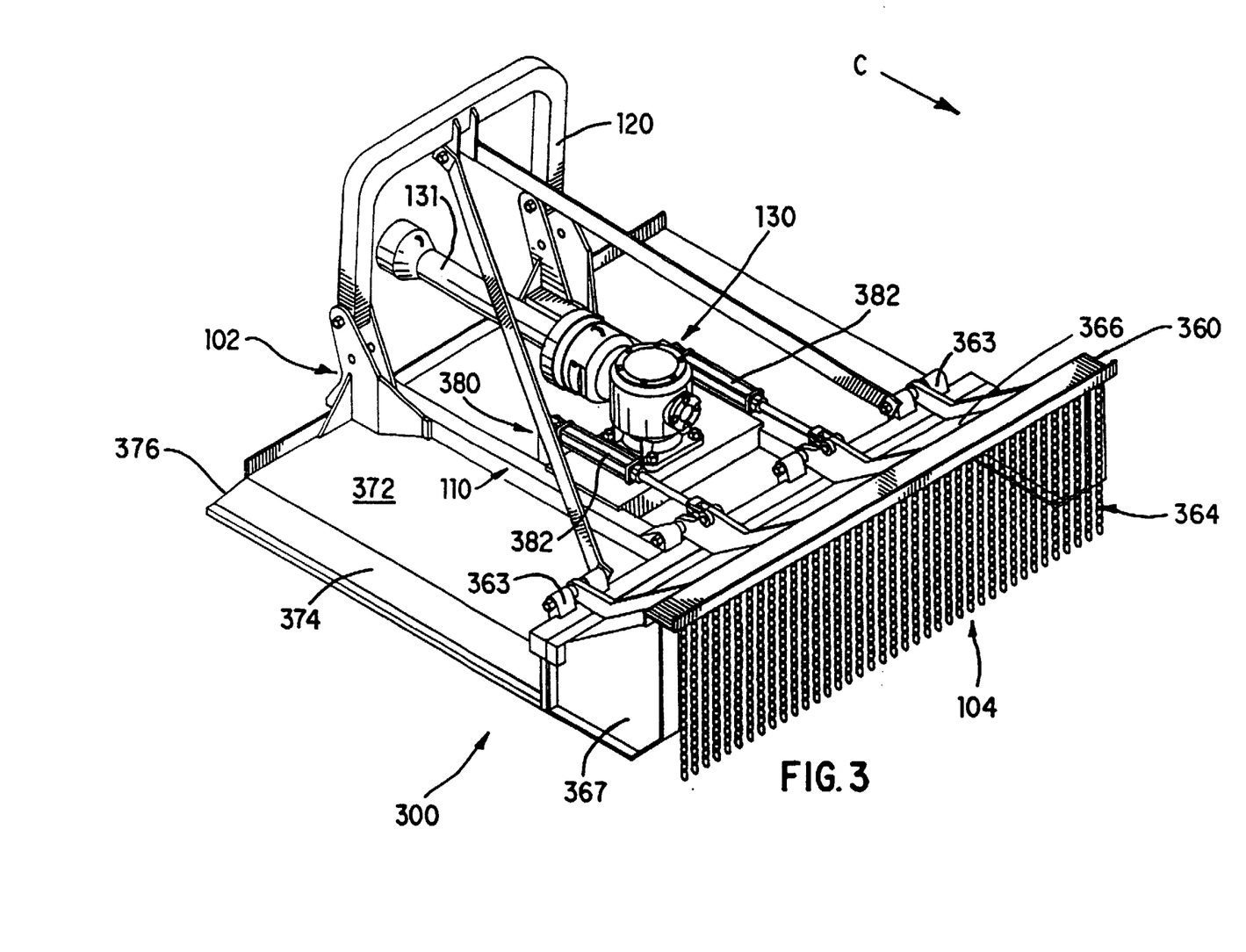
FIG. 3 shows a perspective view of an alternate embodiment of the present invention, with a folding shroud in the downward enclosing position.

An alternate embodiment 300 of the mowing, cutting, and mulching device of the present invention is shown in FIGS. 3 and 4. This embodiment includes frame 110, hitch 120, gear box 130, and rotary cutting assembly 240 as described above. Attached to frame 110 is a deck 372. Deck 372 lies in a plane that is substantially parallel to the path of rotary cutting assembly 240 (see FIG. 4). Extending down from each lateral side of deck 372 is a lateral shroud 374. An end shroud 376 is attached to frame 110 to enclose end 102 of device 300. End shroud 376 is preferably flared outward as shown in FIGS. 3 and 4.

To expose the cutting means for cutting operations, device 300 includes a folding shroud, shown generally as 360 in FIGS. 3 and 4. Folding shroud 360 is pivotally and movably attached to frame 110, such as by a hinge 363, so that folding shroud 360 can be folded upward and toward end 102 to expose rotary cutting assembly 240. Folding shroud 360 includes a lateral portion 367 on each lateral side of device 300, coupled to a top portion 366. A chain drape 364 hangs downwardly from top portion 366 to enclose end 104 of device 300 that is adjacent the cutting means. Although shown as a drape formed from chain, other types of drape material, such as rubber, may be used to form element 364. Chain drape 364 is attached to top portion 366 in a conventional manner, such as by welding or bolting. In a preferred embodiment, chain drape 364 is coupled to top portion 366 by inserting the end link of each chain through a slot (not shown) in top portion 366, and securing these top links with a cable inserted through each top link.

Lateral portion 367 may be formed from a rigid material such as steel plate. Alternatively, lateral portion 367 may be formed from a flexible material, such as rubber or chain.

Folding shroud 360 is movable in a plane substantially perpendicular to the plane of deck 372 from a downward enclosing position to an upward exposing position. In the downward enclosing position, device 300, and rotary cutting assembly 240, are enclosed on all sides. The two lateral sides and end 104 adjacent rotary cutting assembly 240 are enclosed by lateral shrouds 374 and folding shroud 360. End 102 adjacent hitch 120 is enclosed by end shroud 376. In the downward enclosing (mowing and mulching) position shown in FIG. 3, top portion 366 covers the portion of rotary cutting assembly 240 that extends beyond frame 110. Lateral portion 367 of folding shroud 360 is disposed adjacent lateral shroud 374 to enclose each lateral side of device 300. Chain drape 364 of folding shroud 360 is disposed beyond the portion of rotary cutting assembly 240 that extends beyond frame 110, thereby enclosing end 104 of device 300.

In the upward exposing (cutting) position shown in FIG. 4, folding shroud 360 is disposed above the plane of deck 372. Lateral portions 367 and chain drape 364 are each disposed above the plane of deck 372 in the upward exposing position. The portion of rotary cutting assembly 240 that extends beyond frame 110 is uncovered. Thus, in the upward exposing position, rotary cutting assembly 240, particularly blade 242, is exposed for cutting operations.

With end shroud 376, the embodiment shown in FIGS. 3 and 4 is always configured for mowing and mulching operations, even when folding shroud 360 is in the upward exposing position. In the upward exposing position, the embodiment shown in FIGS. 3 and 4 is configured for cutting operations, while simultaneously mowing and mulching.

Moving means, shown generally at 380, is used to move folding shroud 360 between the downward enclosing position and the upward exposing position. One particularly preferred moving means is hydraulic means responsive to manual or operator actuation. As shown in FIG. 3, a hydraulic actuator or cylinder 382 is connected to folding shroud 360 for pivotal movement between the downward enclosing position and the upward exposing position. It is to be understood that, although two actuators are shown in FIG. 3, other configurations of hydraulic actuators are within the scope of the present invention. The hydraulic connections for operator control of hydraulic actuator 382 would be apparent to one of skill in the relevant art, and can be achieved in a conventional manner.

Alternatively, other biasing or moving means such as a spring (for example, spring 582 shown in FIG. 5) can be used for pivotal movement of folding shroud 360 between the downward enclosing position and the upward exposing position. Operator controlled hydraulic actuator 382 is preferred over a spring, particularly for travel through heavy brush and bushes. For example, a three-point hitch with a toggle clevis may be used to mount device 300 to prime mover 600. As it travels through heavy brush and bushes, the hitch will "toggle", pitching device 300 up by pivoting the lower hitch pins, and then down. Such toggling due to heavy vegetation can cause blade 242 to strike a tree at a disadvantageous angle that increases fatigue stresses on blade 242. If an operator-controlled hydraulic actuator is used, the operator can anticipate "toggling" and pitching of device 300 so that folding shroud 360 is pivoted up or down at the appropriate time. However, a spring may not pivot folding shroud 360 up or down at the appropriate time to accommodate pitching of device 300.

In the embodiment illustrated in FIGS. 3 and 4, device 300 is mounted to the front of prime mover 600 in a "pushing" configuration. In such a configuration, prime mover 600 pushes device 300 over the surface of the ground so that device 300 runs over the debris to be severed before the debris reaches prime mover 600. In contrast with the embodiment of device 100 shown in FIGS. 1 and 2, the embodiment shown in FIGS. 3 and 4 moves in the same direction (see arrow C in FIGS. 3 and 4) for each of the mowing, cutting, and mulching operations. As such, there is no need with the embodiment shown in FIGS. 3 and 4 to change directions of the prime mover for cutting a tree.

As prime mover 600 is driven by an operator with folding shroud 360 in the downward enclosing position, vegetation (such as brush, bushes, and saplings) is being mowed and mulched into small pieces. When a tree requiring cutting (too large a diameter for mowing) is encountered, the operator of the prime mover actuates moving means 380 to move folding shroud 360 from the downward enclosing position to the upward exposing position, thereby exposing blade 242 for cutting. Prime mover 600 is then operated without reversing direction to cut the tree. Once the tree is cut, the operator actuates moving means 380 to move folding shroud 360 from the upward exposing position to the downward enclosing position. Prime mover 600 is then run over the cut tree for mulching or grinding. The "pushing" configuration shown in FIGS. 3 and 4 provides more comfortable operator visibility and enhanced maneuverability of device 300, but requires greater operator skill. In the embodiment of FIGS. 3 and 4, a height gauge (such as a tail wheel) is not provided. Consequently, the operator must control the hydraulics to maintain deck 372 level at a constant distance above the ground, as well as operate folding shroud 360. However, the "pushing" configuration saves time because the operator does not have to stop and change direction in order to perform cutting operations. All of the mowing, cutting, and mulching operations can be performed while traveling in the same direction.

The embodiment of FIGS. 3 and 4 is especially suited for cutting in areas of heavy brush. Folding shroud 360 forms a chute having a throat enclosed by chain drape 364. This configuration bends over the brush and small limbs to create tension along the bent edge. This bent edge under tension is then struck by rotating blade 242. The chute funnels the brush into the blade area to be cut and ground or mulched.

The present invention provides a device that is safe to operate and is capable of mowing, cutting, and mulching in a single pass over the terrain. The present invention is safer than conventional mowing or cutting devices because it encloses all sides of the device during mowing and mulching operations. Functionality is maintained because the cutting means can be exposed when necessary for cutting operations. In the embodiment shown in FIGS. 3 and 4, this functionality is enhanced because the cutting means can be exposed while traveling in the same direction, without having to stop and change directions.

Figure 5:
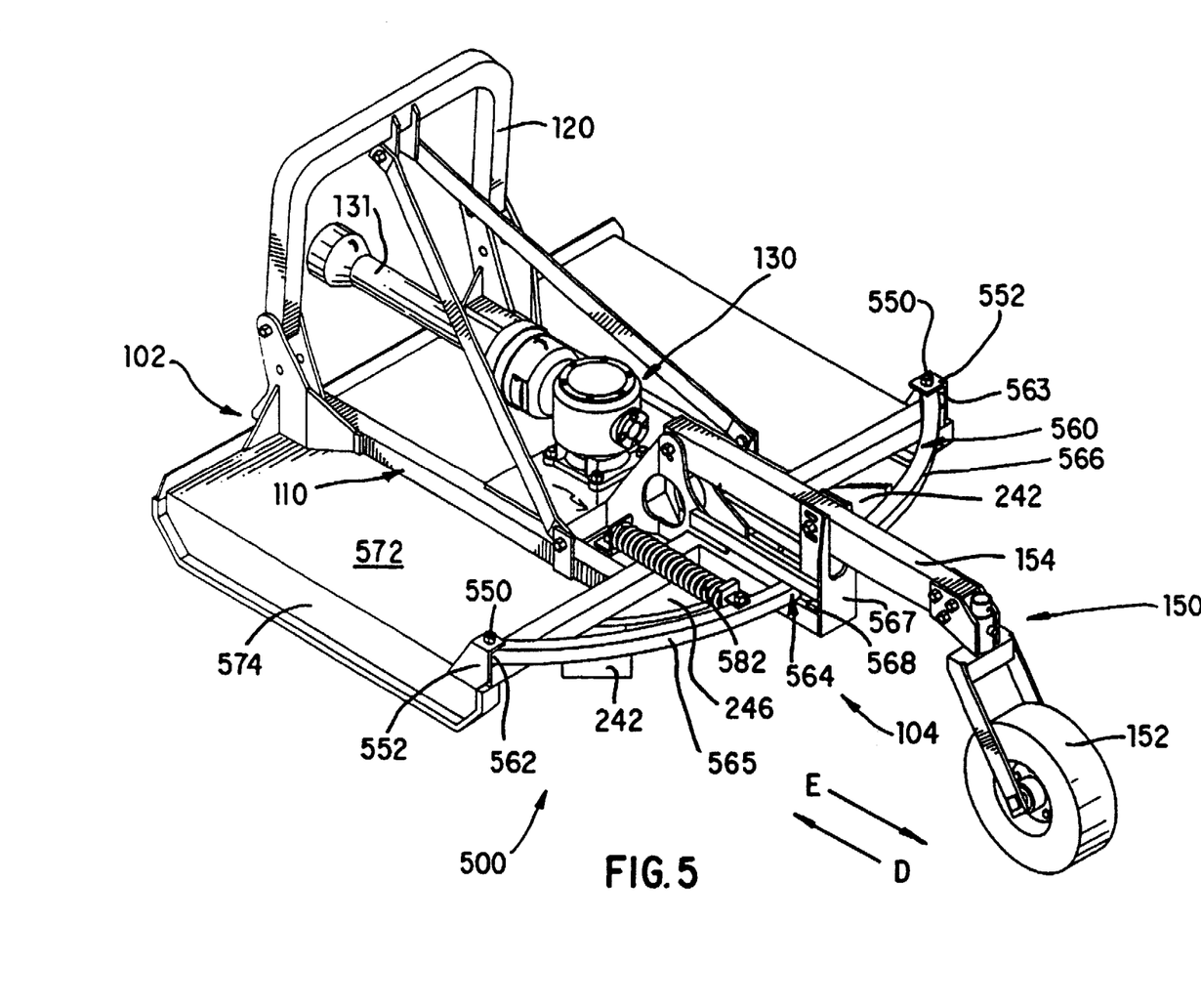
FIG. 5 shows a perspective view of a further embodiment of the present invention.

A further embodiment of the present invention is shown generally at 500 in FIG. 5. This embodiment includes frame 110, hitch 120, gear box 130, tail wheel assembly 150, and rotary cutting assembly 240 as described above. Attached to frame 110 is a deck 572. Deck 572 lies in a plane that is substantially parallel to the path of rotary cutting assembly 240. Extending down from each lateral side of deck 572 is a lateral shroud 574. Deck 572 and lateral shroud 574 can be constructed in a manner similar to that for deck 172 and lateral shroud 174 described above.

A protective bar assembly is provided to provide protection from the rotating blade. During mowing operations, the protective bar assembly is biased outwardly. Device 500 is configured so that the protective bar assembly moves in response to pressure exerted against it, such as by impact with a tree, to thereby expose the cutting means during cutting operations.

With reference to FIG. 5, a protective bar, shown generally at 560, has two ends 562 and 563, each of which is secured to frame 110. Ends 562 and 563 are preferably pivotally secured to frame 110, such as by anchor pivot bolts 550 as shown in FIG. 5. To prevent ends 562 and 563 from snagging or hanging up on wires, fences, vines, or other obstacles, an enclosure 552 is provided for each of ends 562 and 563.

Protective bar 560 includes an intermediate portion 564 between ends 562 and 563. Intermediate portion 564 is slidably disposed in a support 567 that extends from frame 110. Support 567 provides support for intermediate portion 564. Support 567 includes a slot 568 in which intermediate portion 564 slidably moves inward toward frame 110, and outward.

Protective bar 560 as shown in FIG. 5 includes two arcuate sections 565 and 566. End 562 of arcuate section 565 is pivotally secured to frame 110 as described above, and the other end of arcuate section 565 is slidably disposed within slot 568. Similarly, end 563 of arcuate section 566 is pivotally secured to frame 110, and the other end of arcuate section 566 is slidably disposed within slot 568. In a particularly preferred embodiment, arcuate section 565 is separate from arcuate section 566 so that arcuate sections 565 and 566 move independently of one another.

The present invention is not limited to the configuration of protective bar 560 shown in FIG. 5. For example, arcuate sections 565 and 566 may be configured as separate sections, but configured to move together in a simultaneous fashion. Alternatively, protective bar 560 may be formed into a non-arcuate shape.

Movement of protective bar 560 is achieved through the use of biasing means, shown generally at 580 in FIG. 5. Preferably, biasing means 580 includes a spring 582 connected at one end to frame 110 and at the other end to protective bar 560. Spring 582 biases protective bar 560 outwardly, away from frame 110, as shown in FIG. 5. With protective bar 560 biased outwardly, blade 242 is not exposed, and device 500 is configured for mowing operations. Other types of biasing means 580 may be used, such as hydraulics.

Spring 582 responds to pressure exerted against protective bar 560 by compressing. When protective bar 560 impacts an obstacle such as a tree, the resulting pressure compresses spring 582. Consequently, ends 562 and 563 pivot while intermediate portion 564 slides inwardly within slot 568. The compression of spring 582 and inward movement of arcuate sections 565 and 566 exposes blade 242 for cutting operations.

Once the cutting operation severs the tree, spring 582 releases from compression and recoils back to the outwardly biased position shown in FIG. 5. As spring 582 releases, ends 562 and 563 pivot while intermediate portion 564 slides outwardly within slot 568. The outward recoil of spring 582 and protective bar 560 forces or kicks the severed tree off the rotary cutting assembly 240 to avoid unnecessary repeated cuts of the tree. This extends the life of the blades, and more importantly, increases safety, by reducing blade wear and blade fatigue.

In a particularly preferred embodiment, each of arcuate sections 565 and 566 are connected to a separate spring 582. In this manner, arcuate sections 565 and 566 are independently movable. In such a configuration, the spring attached to each arcuate section is responsive to pressure exerted against the corresponding section.

In operation, device 500 is mounted to the rear of prime mover 600 in a "pulling" configuration, as explained above with respect to device 100. Arrow D in FIG. 5 shows the direction of movement of device 500 during mowing operations with protective bar 560 in the biased state (forward direction). Arrow E in FIG. 5 shows the direction of movement of device 500 during cutting operations (reverse direction).

As prime mover 600 is driven by an operator in forward direction D with protective bar 560 in the biased state, vegetation (such as brush, bushes, and saplings) is being mowed. When a tree requiring cutting (too large for mowing) is encountered, the operator of the prime mover changes direction to reverse direction E to back into the tree to be cut. The tree impacts protective bar 560, causing it to slide and pivot inwardly to expose the cutting means. Once the tree is cut, biasing means 580 forces protective bar 560 outward, pushing the cut tree off the cutting means. An operator can then change direction to forward direction D to continue mowing operations.

Figure 7:
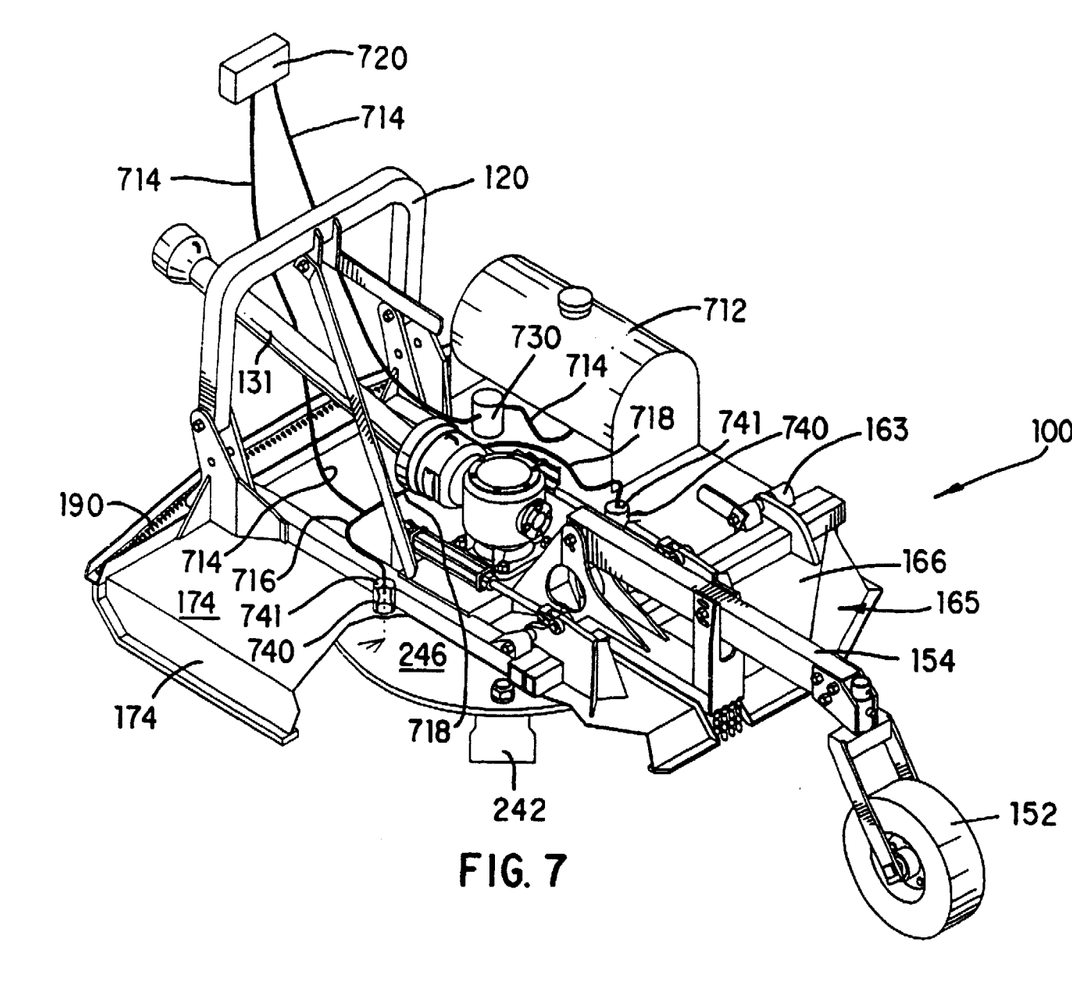
FIG. 7 shows a chemical dispensing assembly of the present invention.

Turning now to FIG. 7, a chemical dispensing assembly of the present invention is shown mounted on the device shown in FIGS. 1 and 2. However, the chemical dispensing assembly may be used with and mounted on any of the embodiments described above. This assembly is preferably used with the embodiment shown in FIGS. 1 through 4 because these embodiments eliminate over-spray, and provide maximum protection against wind drift.

The chemical dispensing assembly of the present invention includes a container 712 or other storage unit that houses the chemical to be applied. The chemical is preferably a weed killer or other herbicide. Other chemicals, including but not limited to, insecticides, pesticides, and fertilizers may also be used. The chemical is pumped from container 712 by a pump 730. Pump 730 may be a hydraulic pump, an electric pump, or other suitable type of pump. The chemical flows through a connecting line or hose 714 to a control unit 720. Control unit 720 may be located on a prime mover, or on the mowing, cutting, and mulching device itself. Control unit 720 is used by the operator to control flow of the chemical. In a preferred embodiment, control unit 720 comprises a valve configured so that a predetermined or metered quantity of the chemical is dispensed. Alternatively, pump 730 may be used to provide a metered quantity of the chemical to be dispensed. An automatic shut off valve may also be provided to cut off dispensing of the chemical when the folding shroud is in an upward exposing position.

Line 714 extends from control unit 720 and splits into two sections, a line 716 and a line 718, one for each lateral side of device 100. Lines 716 and 718 each extends into a cap 741 of a pipe 740 that is welded to the deck. Lines 716 and 718 each terminate within pipe 740 so that lines 716 and 718 are recessed and protected. The chemical is pumped from container 712, flows through lines 714, 716, and 718, and passes through the plane of the deck as it is dispensed onto blade carrier 246. Although two pipes 740, and two terminations of line 714, are shown, it is to be understood that the present invention is not so limited, and that other quantities of pipes 740 may be used.

In a particularly preferred embodiment, blade carrier 246 has a slight upward or dished shape so that the outer edges are higher than the center. As the chemical is dispensed or released onto the blade carrier, the chemical is dispersed via the centrifugal force produced by the rotating blade carrier. The centrifugal force forms drops of uniform size. The drops are of optimal size since the drops reach the ground before they can become airborne. As such, there is no translocation or over-spray. Because the blade carrier is enclosed by the shroud assemblies of the present invention, wind drift is substantially eliminated. The shrouds localize and contain the dispersal of the chemical.

The chemical dispensing assembly of the present invention is easy and less costly to manufacture than conventional devices. Special and precisely manufactured shields and guards are not required for dispersal of the chemical. A special blade carrier or other type of rotary cutter is also not necessary. Additional shields and guards are not required to prevent wind drift.

While various embodiments of the present invention have been described above, it should be understood that they have been presented by way of example only, and not limitation. For example, prime movers other than a tractor can be used, attached either to the front in a "pushing" configuration or to the rear in a "pulling" configuration. Such a prime mover can include a tracked vehicle, a rubber tired vehicle, or a vehicle with a boom assembly. Alternatively, the device of the present invention can itself be configured as a prime mover to form one integrated unit. The folding shroud can be moved by means other than hydraulics or a biasing spring, such as a motor. The folding shroud can be configured with one or more sections, and is not limited to one or two sections as illustrated herein. Thus the breadth and scope of the present invention should not be limited by any of the above described exemplary embodiments, but should be defined only in accordance with the following claims and their equivalents.

What is claimed is:

1. A device for mowing and cutting, comprising:

a frame;

cutting means coupled to said frame;

a protective bar comprising first and second ends pivotally secured to said frame, and an intermediate portion between said first and said second ends;

supporting means coupled to said frame for supporting said intermediate portion of said protective bar;

biasing means coupled to said protective bar for biasing said protective bar away from said frame, thereby configuring the device for mowing, wherein said biasing means is responsive to pressure exerted against said protective bar enabling said intermediate portion to slide toward said frame and said first and said second ends to pivot, thereby exposing said cutting means for cutting.

2. A device according to claim 1, further comprising:

a first anchor pivot bolt for securing said first end of said protective bar to said frame; and a second anchor pivot bolt for securing said second end of said protective bar to said frame.

3. A device according to claims 1, further comprising:

a tail wheel arm coupled to said frame; and a tail wheel coupled to said tail wheel arm.

4. A device according to claim 1, wherein said supporting means defines a slot, wherein said intermediate portion slides within said slot.

5. A device according to claim 1, wherein said protective bar comprises:

a first arcuate section; and a second arcuate section.

6. A device according to claim 5, wherein said biasing means comprises:

a first spring coupled to said first arcuate section; and a second spring coupled to said second arcuate section, wherein said first spring is responsive to pressure exerted against said first arcuate section and said second spring is responsive to pressure exerted against said second arcuate section.

7. A device according to claim 5, further comprising:

a deck coupled to said frame, said deck lying in a plane substantially parallel to a path of said cutting means;

a first lateral shroud coupled to said deck and disposed below said plane along a first lateral side of the device; and a second lateral shroud coupled to said deck and disposed below said plane along a second lateral side of the device, wherein said cutting means is exposed from said first lateral side to said second lateral side for cutting.

8. A device according to claim 7, wherein said first arcuate section and said second arcuate section are independently movable.

9. A device according to claim 5, wherein said first arcuate section and said second arcuate section are independently movable.

10. A device according to claim 1, wherein said biasing means comprises a spring.

11. A device according to claim 1, further comprising:

dispensing means for dispensing a chemical onto said cutting means, wherein said cutting means is configured so that the chemical is dispersed as said cutting means is rotated.

12. A device according to claim 1, wherein a portion of said cutting means extends beyond at least a portion of one end of said frame.

13. A device according to claim 12, further comprising:

a tail wheel arm coupled to said frame; and a tail wheel coupled to said tail wheel arm.

14. A device according to claim 12, further comprising:

a tail wheel arm coupled to said supporting means; and a tail wheel coupled to said tail wheel arm.

15. A device according to claim 1, further comprising:

a deck coupled to said frame, said deck lying in a plane substantially parallel to a path of said cutting means;

a first lateral shroud coupled to said deck and disposed below said plane along a first lateral side of the device; and a second lateral shroud coupled to said deck and disposed below said plane along a second lateral side of the device, wherein said cutting means is exposed from said first lateral side to said second lateral side for cutting.

16. A device according to claim 1, further comprising:

a tail wheel arm coupled to said supporting means; and a tail wheel coupled to said tail wheel arm.

* * * * *